(12) United States Patent
Riepe et al.

(10) Patent No.: US 12,093,623 B2
(45) Date of Patent: *Sep. 17, 2024

(54) RELOCATABLE FPGA MODULES

(71) Applicant: Achronix Semiconductor Corporation, Santa Clara, CA (US)

(72) Inventors: Michael Riepe, San Jose, CA (US); Kamal Choundhary, Santa Clara, CA (US); Amit Singh, San Jose, CA (US); Shirish Jawale, San Jose, CA (US); Karl Koehler, Freemont, CA (US); Simon Longcroft, London (GB); Scott Senst, Walker, MN (US); Clark Hilbert, San Jose, CA (US); Kent Orthner, Santa Cruz, CA (US)

(73) Assignee: Achronix Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/226,108

(22) Filed: Jul. 25, 2023

(65) Prior Publication Data

US 2023/0367940 A1     Nov. 16, 2023

Related U.S. Application Data

(63) Continuation of application No. 17/532,599, filed on Nov. 22, 2021, now Pat. No. 11,853,669.

(51) Int. Cl.
*G06F 30/30*     (2020.01)
*G06F 15/78*     (2006.01)
(Continued)

(52) U.S. Cl.
CPC ............ *G06F 30/347* (2020.01); *G06F 30/31* (2020.01); *G06F 30/392* (2020.01); *G06F 15/7825* (2013.01)

(58) Field of Classification Search
None
See application file for complete search history.

(56) References Cited

U.S. PATENT DOCUMENTS

| 7,328,421 B1 | 2/2008 | Ballagh et al. |
| 7,509,617 B1 | 3/2009 | Young |

(Continued)

FOREIGN PATENT DOCUMENTS

WO    WO-2023091363 A1    5/2023

OTHER PUBLICATIONS

"U.S. Appl. No. 17/532,599, Non Final Office Action mailed Mar. 23, 2023", 8 pgs.

(Continued)

*Primary Examiner* — Leigh M Garbowski
(74) *Attorney, Agent, or Firm* — Schwegman Lundberg & Woessner, P.A.

(57) ABSTRACT

A logic block can be relocated without recompilation from a first area to a second area on a field-programmable gate array (FPGA) if the pattern of fabric tiles in the second area is the same as the pattern of fabric tiles in the first area, and if the two areas have the same dimensions. The design system runs synthesis, placement, and routing on a partition of a design at a first location, exports that partition to a persistent on-disk database, imports one or multiple copies of the partition into a larger design, and moves one or more of the copies from the first area to a target area in the larger design. The compatibility of the second area may be identified based on fabric tile signatures of the first area and the second area.

20 Claims, 10 Drawing Sheets

(51) Int. Cl.
*G06F 30/31* (2020.01)
*G06F 30/347* (2020.01)
*G06F 30/392* (2020.01)

(56) References Cited

U.S. PATENT DOCUMENTS

| | | | |
|---|---|---|---|
| 7,673,271 | B1 | 3/2010 | Becker et al. |
| 7,906,984 | B1 | 3/2011 | Montminy et al. |
| 9,054,977 | B2 | 6/2015 | Kumar et al. |
| 9,185,023 | B2 | 11/2015 | Norige et al. |
| 10,515,180 | B1 | 12/2019 | Sharma et al. |
| 10,547,514 | B2 | 1/2020 | Rao et al. |
| 10,909,296 | B2 | 2/2021 | Wheeler et al. |
| 10,963,302 | B2 | 3/2021 | Li et al. |
| 11,853,669 | B2 * | 12/2023 | Riepe .............. G06F 30/347 |
| 2020/0050729 | A1 | 2/2020 | Wheeler et al. |
| 2023/0169251 | A1 | 6/2023 | Riepe et al. |

OTHER PUBLICATIONS

"U.S. Appl. No. 17/532,599, Notice of Allowance mailed Jun. 23, 2023", 5 pgs.

"U.S. Appl. No. 17/532,599, Response filed Jun. 8, 2023 to Non Final Office Action mailed Mar. 23, 2023", 13 pgs.

"International Application Serial No. PCT/US2022/049693, International Search Report mailed Apr. 13, 2023", 4 pgs.

"International Application Serial No. PCT/US2022/049693, Written Opinion mailed Apr. 13, 2023", 7 pgs.

Christian, Beckhoff, et al., "Go Ahead: A Partial Reconfiguration Framework", Proceedings of the IEEE 20th Annual International Symposium on Field-Programmable Custom Computing Machines, (Apr. 29, 2012), 8 pgs.

Gindin, R, et al., "NoC-Based FPGA: Architecture and Routing", Proc. of the First Int'l Symposium on Networks-on-Chip (NOCS-07), IEEE Computer Society, (2007), 10 pgs.

Moller, Leandro, et al., "Improving QoS of Multi-layer Networks-on-Chip with Partial and Dynamic Reconfiguration of Routers", Rpoceedings of the IEEE International Conference on Field Programmable Logic and Applications, (Aug. 31, 2010), 5 pgs.

Orthner, K, "Applying the Benefits of Network in a Chip Architecture to FPGA System Design", White Paper, Intel FPGA, Version 1.6, (2018), 9 pgs.

Sohanghpurwala, Ali Asgar, et al., "OpenPR: An Open-Source Partial-Reconfiguration Toolkit for Xilinx FPGAs", Proceedings of the IEEE International Symposium on Parallel and Distributed Processing Workshops and Phd Forum, (May 16, 2011), 8 pgs.

* cited by examiner

RELOCATABLE FPGA MODULES

PRIORITY APPLICATIONS

This application is a continuation of U.S. patent application Ser. No. 17/532,599, filed Nov. 22, 2021, the content of which is incorporated herein by reference in its entirety.

BACKGROUND

Field-programmable gate arrays (FPGAs) are integrated circuits customized after manufacture. An FPGA comprises an array of logic blocks comprising elements such as lookup tables (LUTs), adders, and flip-flops, as well as more complex logic blocks.

BRIEF DESCRIPTION OF THE DRAWINGS

Some embodiments of the disclosed technology are illustrated by way of example and not limitation in the figures of the accompanying drawings.

DETAILED DESCRIPTION

Figure 1:
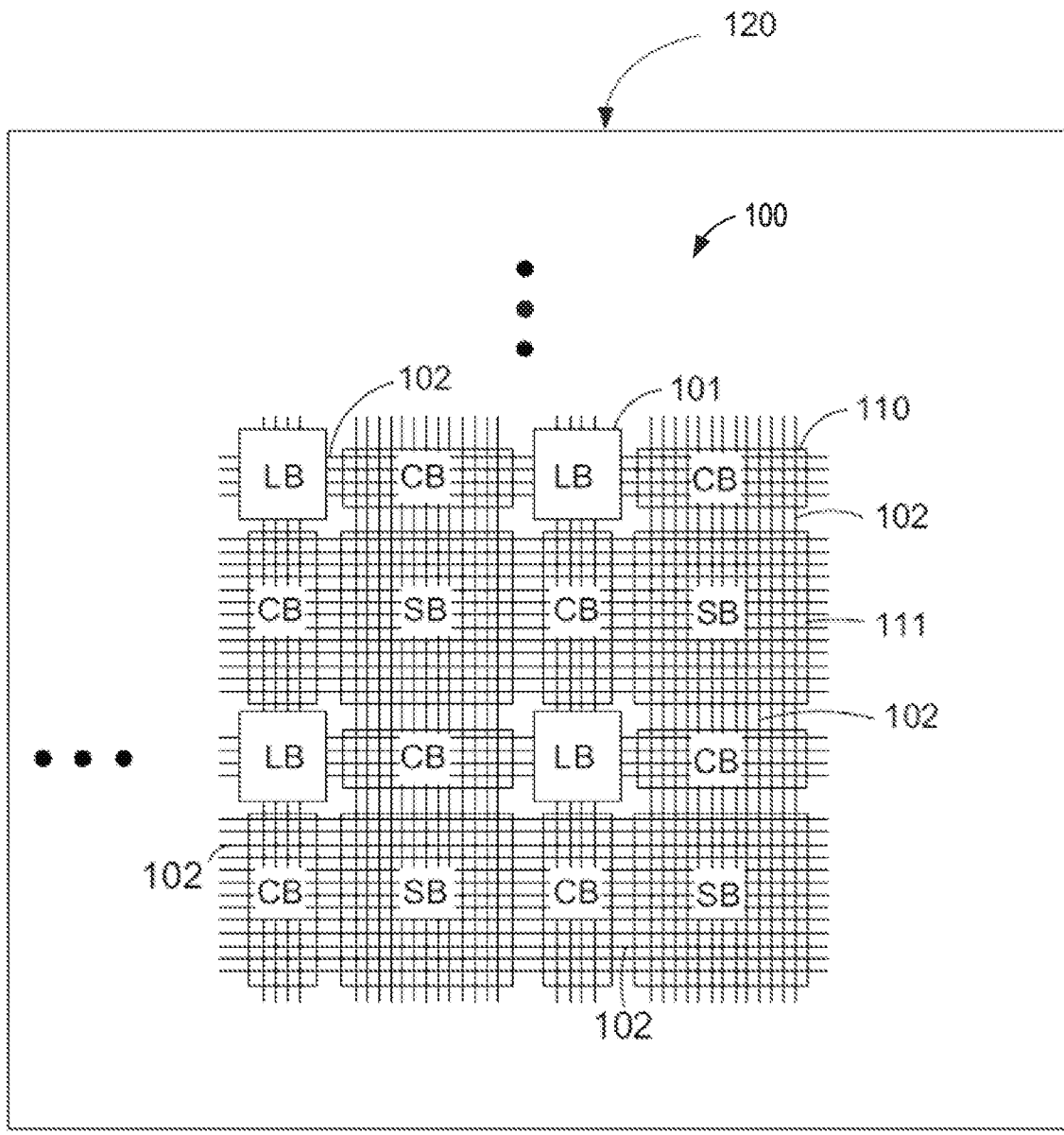
FIG. 1 is a diagrammatic view of an example FPGA chip fabric, according to various embodiments of the invention.

Example methods, systems, and circuits for relocatable FPGA modules will now be described. In the following description, numerous examples having example-specific details are set forth to provide an understanding of examples. It will be evident, however, to one of ordinary skill in the art that these examples may be practiced without these example-specific details, and/or with different combinations of the details than are given here. Thus, specific examples are given for the purpose of simplified explanation, and not limitation.

The term "module" refers, depending on the context, to the design for a circuit or to the circuit itself. A circuit design consists of a single module or of a plurality of modules organized hierarchically in a tree structure. A hierarchical circuit design consists of a single root module, also called the top-level module or the parent module, containing one or a plurality of child modules, each of which may itself contain one or a plurality of other modules. Modules at the bottom of the hierarchy are called leaf modules. Thus, during programming of an FPGA, modules are placed in the design by a circuit design tool. After bitstream programming, the resulting FPGA is referred to as comprising the modules. Each module on an FPGA typically provide functionality by receiving inputs and generating outputs. During design, the placement and routing for a module can be relocated from a first position to a second position on the FPGA without recompilation if the pattern of FPGA fabric placement sites and routing wires at the second position is identical to the pattern at the first position. Thus, multiple copies of the module can be programmed into a device without determining the synthesis, placement and routing of the module multiple times.

Any module may consist of a mixture of other modules, and components from a library of supported logical primitives (e.g., LUTs, arithmetic logic units (ALUs), Block Random Access Memories (BRAMs), digital signal processors (DSPs), or any suitable combination thereof). In a module, the input and output pins of the contained sub-modules and primitive components are connected together by nets. There can be an arbitrary number of levels of modules and sub-modules in this logical hierarchy. An FPGA synthesis, placement, and routing tool will process the top-level module as if it were flat—consisting of nets connecting together all of the primitive components, with the module boundaries flattened away or ignored. That flat hierarchy is called the physical hierarchy. Modules may be exported from the logical hierarchy, along with their placement and routing data, into a standalone database. The region of the circuit containing the compiled module is the "partition" for the module. To export a module in a partition, the boundaries of the exported module in the physical hierarchy are preserved. The partition can be imported into a design at compatible locations without recompiling the module.

The design system runs synthesis, placement, and routing on a module of a design at a first location, exports that module as a partition, imports one or multiple copies of the partition into the same or a different design, and moves one or more of the copies from the first location to target locations in the design into which the one or more copies of the partition were imported.

FPGA fabrics are designed as repeated copies of a basic set of tiles, and the layout for each instance of a tile are identical. But the tiles may be arranged in a grid with non-repeating pattern of rows and columns, and the rows and columns may be interrupted periodically with structures to distribute clock and reset nets. In order to move the placement and routing data of a module from a source location to a target location, the patterns of placement sites and data routing wires covered by the module must match exactly. Otherwise, the sites and or wires will not line up correctly, leaving unplaced instances and unrouted wires. Further, although the patterns of clock-buffer sites (i.e., circuitry that creates one or more copy or derivative clock signals from a reference clock) and clock routing wires should ideally also match exactly, in the event they do not, after the datapath logic has been relocated, the clock routing can be re-implemented as an additional step.

Described herein is an FPGA fabric which has been designed with a regular layout of sites and routing wires at a very fine level of granularity in order to facilitate the ability to move modules from one location to another. Also described are software features that carry out the movement and duplication of modules from one location of a design to another.

The FPGA fabric may be designed with more than one level of repeated layout hierarchy. Layout designers would create the layout for the basic tiles first (e.g., look-up tables (LUTs), block read-only memory (BRAM), digital signal processing (DSP) tiles, input/output (I/O) tiles, and the like). To make the fabric regular, the layout designers then create a second level of hierarchy. For example, the second level of hierarchy may include a small cluster that contains columns of one or more types of core tile (e.g., each type except I/O tiles) with the desired frequency and adjacencies for the particular FPGA design. The complete chip is constructed by repeating many copies of the cluster in a two-dimensional grid. Minor irregularities may be present in the form of a ring of I/O tiles around the periphery and the occasional interruption of the pattern by a clock distribution row or column. Those clock row and column irregularities can be handled by re-routing the clock signals and without recompiling the data path portions of the module, if the irregularities don't contain any placement sites or routing multiplexers.

The regularity in an FPGA design may be facilitated by the presence of a network-on-chip (NoC); because global signals between modules and chip I/O signals can be routed through the NoC, there is no longer a need to route these signals through the general-purpose FPGA routing network. Such signals otherwise would traverse or intersect with modules and introduce irregularities inside otherwise identical modules, because these global or I/O connections could be different for each instance of a module. Further, a NoC may be used to transmit a global or local clock for use by a module, thereby eliminating any clock irregularity. The NoC tiles may be the largest tiles in the chip core. In these example embodiments, each cluster contains one NoC tile along with the tiles in all four directions from the NoC tile extending one-half of the distance to the next NoC tile. For example, if NoC tiles are located in a grid and spaced 10 µm apart, each cluster contain one NoC tile along with the tiles in a square extending 5 µm in each of the four directions from the NoC tile.

The export and import of modules may be useful for machine-learning designs, such as convolutional neural networks (CNNs), because their basic operators, such as Matrix Vector Multiply (MVM) and 2-Dimensional Convolution (conv2d), are highly parallelizable. The designs therefore often consist of many copies of identical functional blocks that are repeated in a regular pattern across the FPGA. Rather than attempting to place-and-route (PnR) the entire top-level design "flat," each block can be implemented as a module, and that module placed and routed as a partition in a separate design, that partition can be exported to an on-disk file that contains the partition's synthesized netlist and placement and routing data, and then all of the exported partitions may be imported into a new top-level design. Using partitions this way has two advantages. First, top-level timing can be closed more easily because each partition is being optimized separately in its own session without interdependencies between partitions. Second, processing time may be reduced by running place-and-route on a single partition of a module, exporting this partition, and later importing the synthesized netlist and placement and routing data from the file for this partition for each repeated block. Importing the partitions typically runs much faster than running the entire design flat.

Software for implementing the movement operation to move a partition from a first location to a compatible second location may comprise the following methods.

A method for dividing a complete design into smaller modules. In one embodiment this can consist of a netlist with at least two levels of hierarchy. A lower level of hierarchy consists of leaf-level instances of library primitives that are connected together with wires into a data structure called a module, and an upper level of hierarchy consisting of instances of modules connected together with wires. The upper level of hierarchy can, without loss of generality, consist of a mixture of leaf-level instances and module instances connected together with wires.

A method for creating designs that consist of repeated copies of a set of modules. In one embodiment this can consist of the hierarchy described above with at least two levels of hierarchy in which there can be more than one instance of a given sub-module in the upper level of hierarchy.

A method for preserving the boundaries of the two-level hierarchy after it has been flattened in such a way that any logical optimizations will not modify the module interfaces. In one embodiment this can be implemented with a special type of leaf-level library primitive called a virtual boundary marker, or more simply, a virtual-pin. Any netlist optimization algorithms will prevent a net that connects a virtual pin from being optimized away, will prevent constant propagation from operating across the virtual pin, and will prevent other optimizations such as gate remapping and retiming from moving logic across the virtual pin. In another embodiment, the collection of sets of pins that represent the block boundaries in the flattened netlists can be recorded in a separate data structure, and the optimization algorithms will consult that data structure to see which pins or nets are part of the boundaries and should not be changed.

A method for controlling the locations at which leaf-level instances of a partition, and the location of routing wires that are used to connect those instances together, are placed. In one embodiment, a user can create a placement and routing constraint called a placement region that consists of a rectangular or rectilinear set of fabric tiles. All leaf-level instances in the partition must be placed within the boundaries of that region, and all routing wires in the partition (with the exception of wires that cross between partitions) must stay within the boundary of that region. When each partition is confined to a region, and the regions are non-overlapping, the partitions can be placed and routed separately as their own top-level module, which guaranteeing that they will not interfere with each other when they are assembled together in a top-level design.

A method for exporting the placement and routing data for a partition into a stand-alone database that does not include the top-level module. In one embodiment, this can be implemented by exporting a database that consists of all of the instances and wires of the module, including the virtual pins, along with the placement data for those instances, and along with the routing data for all of the wires inside the boundary defined by the virtual pins. The on-disk persistent format of this stand-alone exported database will be obvious to one skilled in the art.

A method for importing the placement and routing data for a partition into a different top-level design. In one embodiment, the new top-level design can consist of a mixture of instances of leaf-level library primitives, of ordinary modules, and of empty black box modules with the same port-level interfaces as the exported partitions, but without any contents. Each partition can be imported by reading in its exported database, performing a "tear and stitch" operation that locates the nets from the top-level netlist that connect to the black box instance pins, unhooking them from the black box pins (the Tear operation), and connecting them to the corresponding sets of pins on the virtual boundary markers in the imported database netlist (the Stitch operation). All placement and routing data for the partition replacing the blackbox is imported along with the partition's netlist.

A method for preventing the placement and routing tools from modifying the netlist of the imported partitions, including the leaf level instances and the nets connecting them together, the placement of those instances, and routing data for those nets. In one embodiment this can be implemented by placing an attribute on those instances and nets that the placement and routing software can consult to see if they are "locked" in place and should therefore not be modified.

A method for moving the placement and routing data for a partition from its original location (referred to as the "source" location) to a different but compatible location (referred to as the "target" location) after it is imported. In one embodiment this can consist of a coordinate system that unambiguously specifies both the source and target locations, an algorithm that locates each instance and routing wire, finds its location relative to the source location as an offset in X and Y, applies that same X and Y offset to the target location coordinate, and then moves the instance from the source to the target location.

A method for determining a set of candidate target locations that are compatible with a source location. In one embodiment, this can consist of an algorithm that determines the X and Y location of the source, as well as the module's height and width, then analyzes the set of fabric tiles that lie inside that boundary defined by the X and Y location, height, and width, calculates a signature based on the pattern of tiles, and then finds all other candidate X and Y locations with the same height and width and the same tile signature, and then reports that back to the user. In some embodiments the set of candidate locations might be non-overlapping, and in other embodiments they may be allowed to overlap.

A method for reporting the set of candidate locations to the user, and allowing the user to choose one of the candidate locations as the desired target location when moving a partition. In another embodiment, a partition could be copied and then moved in the original design flow, without need for it to be exported from one design and then imported into a second design. In addition to copying the placement and routing data, the software implementation also copies the module's netlist. All unconnected inputs (for example, clocks and resets) in the copies are connected to the same driver as the original copied netlist. All output pins are left unconnected for the user to connect.

FIG. 1 is a diagrammatic view of an example FPGA chip fabric 100, according to various examples of the invention. The fabric 100 contains programmable arrays of logic blocks 101 that support a variety of programmable logic functions, such as but not limited to, lookup tables, block RAMS, arithmetic units, and digital-signal-processing units. Logic blocks 101 may be of different types, different sizes, or both. Routing tracks 102 in the fabric 100, illustrated as a plurality of orthogonally oriented tracks, are used to carry electronic signals, and implement reconfigurable interconnections between the logic blocks 101. The major elements of a flexible routing architecture used to interconnect the routing tracks and configure the logic blocks include connection boxes 110 and switch boxes 111.

In implementation, the switch boxes 111 can be switches that connect wires to wires (e.g., the wires in the horizontal and vertical routing tracks: wires in horizontal tracks to wires in horizontal tracks, wires in vertical tracks to wires in vertical tracks, and wires in horizontal tracks to wires in vertical tracks). The connection boxes 110 can be switches that connect wires in horizontal and/or vertical tracks to the logic block 101 elements. For purposes of illustration, only exemplary elements in the drawing figure have been marked. However, a person of ordinary skill in the art will understand that the routing tracks 102, the connection boxes 110, and the switch boxes 111 can, in practice, be replicated over the surface of a semiconductor chip in order to provide the desired interconnection functionality.

The structure of the connection boxes 110 and the switch boxes 111 determine the connections of the routing tracks 102 to the logic blocks 101, thereby determining the functionality of a semiconductor chip 120 that includes them. For example, a semiconductor chip 120 that includes the fabric 100 may be fabricated as an FPGA, such as the type available from Achronix™, AMD™, Intel™ and other vendors.

Figure 2:
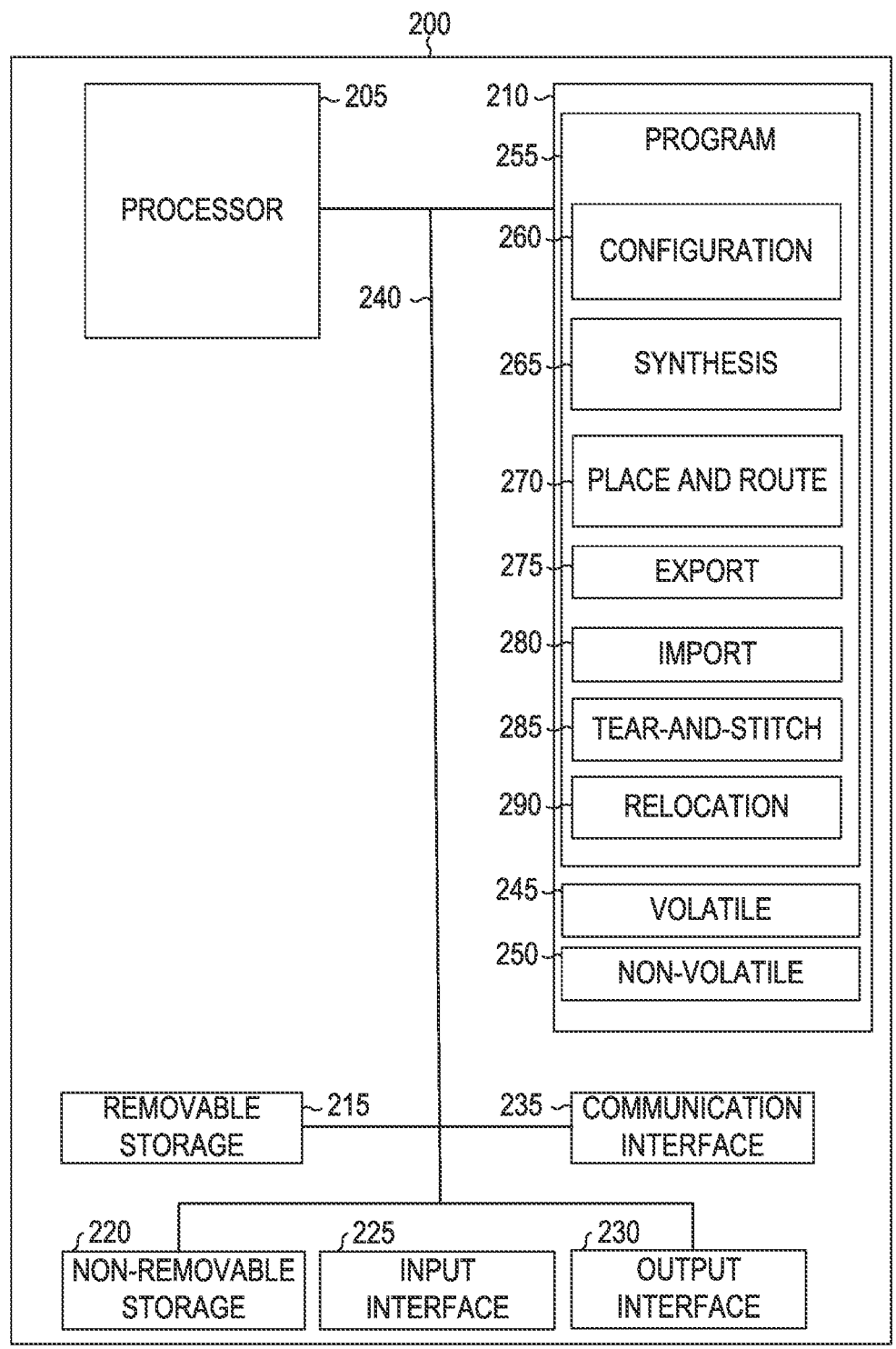
FIG. 2 is a block diagram illustrating components of a system that programs an FPGA, according to various embodiments of the invention.

FIG. 2 is a block diagram illustrating components of a computer 200 that programs an FPGA, according to some examples. All components need not be used in various embodiments. For example, clients, servers, autonomous systems, and cloud-based network resources may each use a different set of components, or, in the case of servers for example, larger storage devices.

One example computing device in the form of a computer 200 (also referred to as computing device 200 and computer system 200) may include a processor 205, memory storage 210, removable storage 215, and non-removable storage 220, all connected by a bus 240. Although the example computing device is illustrated and described as the computer 200, the computing device may be in different forms in different embodiments. For example, the computing device may instead be a smartphone, a tablet, a smartwatch, or another computing device including elements the same as or similar to those illustrated and described with regard to FIG. 2. Devices such as smartphones, tablets, and smartwatches are collectively referred to as "mobile devices." Further, although the various data storage elements are illustrated as part of the computer 200, the storage may also or alternatively include cloud-based storage accessible via a network, such as the Internet, or server-based storage.

The memory storage 210 may include volatile memory 245 and non-volatile memory 250, and may store a program 255. The computer 200 may include, or have access to, a computing environment that includes, a variety of computer-readable media, such as the volatile memory 245; the non-volatile memory 250; the removable storage 215; and the non-removable storage 220. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 200 may include or have access to a computing environment that includes an input interface 225, an output interface 230, and a communication interface 235. The output interface 230 may interface to or include a display device, such as a touchscreen, that also may serve as an input device. The input interface 225 may interface to or include one or more of a touchscreen, a touchpad, a mouse, a keyboard, a camera, one or more device-specific buttons, one or more sensors integrated within or coupled via wired or wireless data connections to the computer 200, and other input devices. The computer 200 may operate in a networked environment using the communication interface 235 to connect to one or more remote computers, such as database servers. The remote computer may include a personal computer (PC), server, router, network PC, peer device or other common network node, or the like. The communication interface 235 may connect to a local-area network (LAN), a wide-area network (WAN), a cellular network, a WiFi network, a Bluetooth network, or other networks.

Computer instructions stored on a computer-readable medium (e.g., the program 255 stored in the memory storage 210) are executable by the processor 205 of the computer 200. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 255 is shown as including a configuration component 260, a synthesis component 265, a place and route component 270, an export component 275, an import component 280, a tear-and-stitch component 285, and a relocation component 290. Any one or more of the components described herein may be implemented using hardware (e.g., a processor of a machine, an application-specific integrated circuit (ASIC), an FPGA, or any suitable combination thereof). Moreover, any two or more of these components may be combined into a single component, and the functions described herein for a single component may be subdivided among multiple components. Furthermore, according to various examples, components described herein as being implemented within a single machine, database, or device may be distributed across multiple machines, databases, or devices.

The configuration component 260 provides a user interface to allow a user to provide a configuration for an FPGA. For example, the user interface may allow the user to identify a hardware description language (HDL) file that specifies the configuration at a high level of abstraction. The user interface may allow the user to synthesize (via the synthesis module) and map the HDL description into a netlist or a schematic that specifies the configuration at a low level of abstraction as a netlist of instances of library primitives connected together by wires. In another embodiment, that netlist may consist of a hierarchy with one or more levels of modules as described previously. The user interface may also allow the user to identify modules in that hierarchy that are to be exported as partitions, and thus cause the insertion of virtual pins to preserve the hierarchy when the hierarchical netlist is flattened. The user interface may also allow the user to specify rectangular or non-rectangular placement region constraints that will direct the synthesis component 265 and place and route component 270 to constrain instances and wires that belong to a partition to remain within the boundary of said region.

The synthesis component 265 and the place and route component 270 programs the FPGA based on the configuration. For example, the connection boxes 110, the switch boxes 111, and the routing tracks 102 may be configured. As another example, the connections to and from LUTs, as well as their contents (i.e., the particular output generated for each combination of inputs), may be configured. The synthesis component 265 will cause nets that cross between partition boundaries (through a virtual pin or marked in a database of boundary nets/pins) to be preserved, and prevent logic from being optimized across said partition boundaries. The place and route component 270 will cause instances and wires to be confined to stay within the boundary of any region to which they are assigned.

The export component 275 executes after placement and routing, identifies modules in the logical hierarchy that have been marked as partitions, and exports their netlist, placement and routing data as stand-alone partition databases (one for each partition). The import component 280 executes before placement, identifies black-box modules that have been marked as partitions, and imports the netlist, placement, and routing data from the partition database into the program memory. The tear-and-stitch component 285 causes the imported partition netlists to be connected to each other and to the non-blackbox netlists in the design. It does this by disconnecting the nets that connect to the black-box modules, and re-connecting those nets to the boundary nets (those connecting to a virtual pin, or recorded in the boundary net/pin database) in the imported partition netlists. The relocation component 290 processes partitions that have been imported more than once, which overlap with other partitions, or which the user otherwise wishes to relocate. It calculates the source location of each partition, identifies compatible target locations for each partition, selects a target location for each partition such that they are compatible and non-overlapping, and moves all of the instances and wires of each partition from their source location to their target location, relative to the partition's bounding box or anchor instance. A user interface may be presented to allow the user to select the target location for each partition from among the identified compatible locations.

Figure 3:
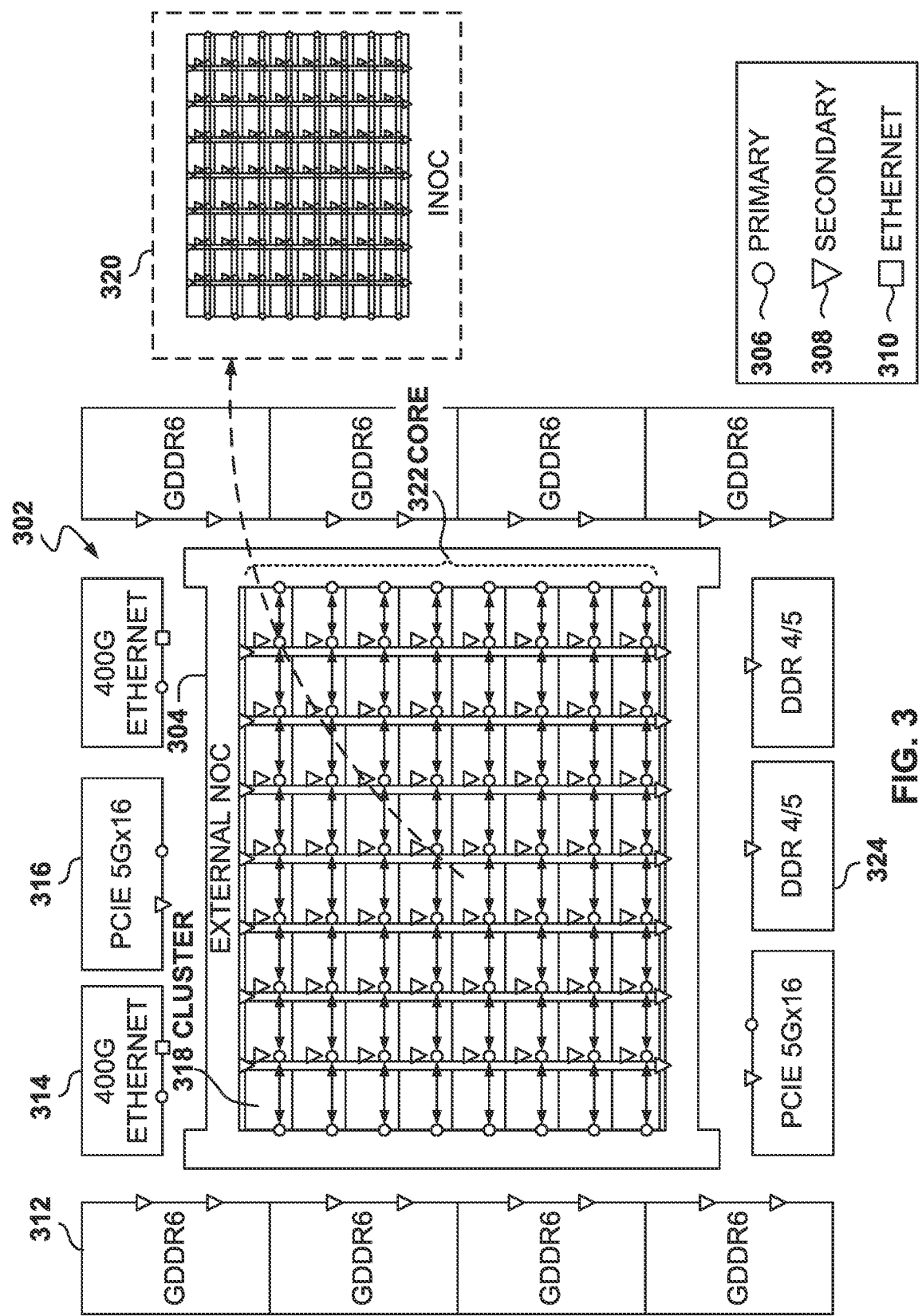
FIG. 3 illustrates the architecture of an FPGA with on-chip networking capabilities, according to some example embodiments.

FIG. 3 illustrates the architecture of an FPGA 302 with on-chip networking capabilities, according to some example embodiments. The FPGA 302 includes an external NoC (eNoC) 304 and an internal NoC (iNoC) 320, which provide high-throughput and easy-to-use access between peripherals and the FPGA core 322. The combination of iNoC 320 and eNoC 304 are referred to herein as the NoC. The FPGA core 322 is surrounded by the eNoC 304 and includes the clusters 318, which are units of programmable logic configurable by the user.

In a typical FPGA, it may be difficult to move data quickly because the FPGA logic runs slower than typical dedicated processing logic. The NoC implements a hierarchy of networks that allows high throughput and fast data movement inside the FPGA.

There is a plurality of external interfaces that exchange data with the outside of the FPGA 302, such as Ethernet controller 314 with Ethernet connection 310, PCIe controller 316, and GDDR6 controller 312. In a traditional FPGA, the external interfaces are connected directly to the clusters 318 and the ability to transfer data is then limited by the speed of the clusters 318 and the network bandwidth available to send data to the clusters 318. Further, data exchange may require consuming a large number of clusters 318. For example, if the PCIe controller 316 wants to talk to DDR-4/5 controller 324, the user has to design the FPGA to carry read and write requests all the way across the fabric, in both directions, and this would require the use of a large amount of user logic that may not be used for other purposes. Further, the transfer would be slow when compared to the speeds supported by the external interfaces.

In some example embodiments, the eNoC 304 and the iNoC 320 support read/write transactions between primaries and secondaries. Primary/secondary is a model of communication where one device or process has control over one or more other devices. In the FPGA 302, the primary is able to initiate transactions, i.e., send requests, while the secondary waits for any primary to send a request. The eNoC 304 also supports cut-through and store-and-forward communications.

The primaries include, at least, PCIe controller 316, user-implemented primaries in the FPGA core 322, and a FPGA control unit (FCU) (allowing bitstream commands to read and write peripheral control and status (CSR) interfaces). The secondaries include, at least, GDDR6 controllers 312, DDR-4/5 controllers 124, user-implemented secondaries in the FPGA core 322, PCIe controller 316, the FCU (allowing primaries in the subsystem, such as PCIe, to configure the FPGA 302), and CSR interfaces of clusters 318 (e.g., including phase lock loops (PLLs), Input/Outputs, top-level clock/reset). Each of the clusters 318 may contain one NoC tile along with the tiles in all four directions from the NoC tile extending one-half the distance to the next NoC tile.

In some example embodiments, the iNoC 320 is implemented with regularly-spaced elements in the FPGA core 322, and the iNoC 320 includes a plurality of columns and a plurality of rows. The example illustrated in FIG. 3 includes seven columns and eight rows, but other embodiments may use a different number of columns and rows (e.g., in the range from 1 to 50 or more, although other values are also possible).

In some example embodiments, each row includes a fast data path (e.g., 512 Gbps, but other speeds are also possible) in the eastbound and westbound directions, and each column includes a fast data path in the northbound and the southbound directions.

The iNoC 320 and eNoC 304 transport packets and provide a packet-transfer interface to the modules using the NoC. In some example embodiments, the packet interface supports Advanced Extensible Interface (AXI) read and write transactions. AXI is part of the Advanced Microcontroller Bus Architecture (AMBA), which is an open-standard, on-chip interconnect specification for the connection and management of functional blocks in system-on-a-chip (SoC) designs.

The user logic in the cluster 318 can issue AXI read or write transactions to a local network access point (NAP) in the cluster 318. Based on the routing logic, the iNoC 320 carries the transaction to the eNoC 304 at the east or west boundary of the FPGA core 322. In some example embodiments, the iNoC 320 transports transactions issued by user FPGA logic to the east or west, and transactions destined to the FPGA user logic arrive from the north or south, but other traffic patterns may also be supported.

In one embodiment with 512 Gbps transport on the iNoC 320, assuming 4-cycle bursts, each iNoC row is able to support 409 Gbps of write data throughput, since the write command is sent as the first cycle of each transaction. Larger-size bursts will result in higher throughput, and smaller-size bursts will result in lower throughput. The transactions on each row or column share the available bandwidth with other transactions on the same row or column.

Each column of the iNoC 320 operates similar to the rows, except packet data is carried in the northbound or southbound directions. In some example embodiments, the horizontal component of the iNoC 320 allows the user logic in cluster 318 to issue read/write transactions (e.g., AXI transactions), and the vertical component of the iNoC 320 allows IP components outside of the FPGA core 322 to issue transactions to the clusters 318. In other words, the FPGA primaries 306 connect to the rows of the iNoC 320, and the FPGA secondaries 308 connect to the columns of the iNoC 320.

The iNoC 320 supports multiple traffic types, including transaction data and packet data streams. The transaction data includes read and write commands, data, and responses. The command transfers are typically a single cycle, and data transfers are typically short, with 4-cycle transactions being common.

The traffic types include Cache Coherent Interconnect for Accelerators (CCIX) data, packet data, and raw user data. In some example embodiments, the iNoC 320 carries CCIX data from the PCIe controller 316 when working in CCIX mode. This is presented to the user as a CSX-protocol formatted data stream, which is effectively a segmented interface that the user unpacks.

The packet data may be bundled as longer streams of data. In some example embodiments, the iNoC 320 imposes no upper limit on packet sizes. Further yet, with regards to raw user data transport, the iNoC 320 transports flits between NAPs within the same column or the same row, and the flits are combined to form the packets.

In some example embodiments, each row of the iNoC 320 presents a primary 306 to the eNoC 304 on the west side of the FPGA core 322, and another primary 306 on the east side of the FPGA core 322. Each column of the iNoC 320 presents a secondary 308 to the iNoC 320 on the north side and another one on the south side. This allows user logic to read or write any external IP or CSR interface, and allows any external IP with a primary interface to access any NAP with attached user logic.

In some example embodiments, the eNoC 304 is a ring around the FPGA core 322 that carries transactions from the outside of the eNoC 304 to the clusters 318, and vice-versa, as well as between clusters 318. In some example embodiments, the eNoC 304 provides address decoding, transaction command and response routing, message-width adaptation, frequency adaptation (e.g., clock domain crossing), burst adaptation, and protocol conversion.

The eNoC 304 carries read and write transactions. In some example embodiments, the eNoC 304 does not carry Ethernet packets, SerDes data, or CCIX data, and does not carry interrupt information. However, other embodiments may transport one or more of Ethernet packets, Serdes data, CCIX data, and carry interrupt information.

The combination of iNoC 320 and eNoC 304 is such that any access point in the FPGA 302 has access to any interface IP secondary interface, including any of the GDDR6 controller 312, DDR-4/5 controller 324, and PCIe controller 316 interfaces.

In some example embodiments, each memory interface presents a secondary (e.g., with a data path width of 256*b*) to the NoC and accepts read and write transactions. Further, the primaries 306 and secondaries 308 of the PCIe controller 316 are connected directly to the eNoC 304.

A NoC node, or simply referred to herein as a node, is a component of the network that is connected, and in communication with, other nodes. Each node comprises, for each direction of traffic, a router, and a NAP. The NAP has the connections to the local user logic in the cluster 318 and the router carries packets (e.g., flits) to other routers in other nodes. Thus, user logic accesses the NoC by communicating with the NAP that interfaces with the router.

The router makes routing decisions for the flits travelling on the network and the NAP "slows" the transfer of data from the high-speed NoC network to the lower speeds of the user logic in the cluster 318. The NAP also formats the data into the corresponding protocol, such as Ethernet or AXI. An EW (east-west) router is a router in the east-west direction, that is, a router in the rows of the iNoC 320. A NS (north-south) router is a router in the north-south direction, i.e., a router in the columns of the iNoC 320.

CXS, or CXS interface, refers to the CCIX Stream Interface. A Graphics Double Data Rate Memory (GDDR), or GDDR6, is a memory unit (JEDEC standard 6.0 is inferred unless specified otherwise). A Dual Data Rate Memory (DDR), or DDR4, is a memory unit (JEDEC standard 4.0 is inferred unless specified otherwise). A WAW flit is a special kind of flit encapsulating both write data channel and write address channel in the same flit, allowing for more efficient data transport. The Ethernet Interfacing Unit (EIU) is the interface that sends Ethernet data to iNoC columns. Further, a CCIX Interfacing Unit (CXIU) is the interface that sends CXS data to iNoC columns.

Each node has two sets of router and NAP combinations: an EW router and NAP, and an NS router and NAP. Further, the router at each node is independent from other routers and drives incoming flits to either the next node (next router) or towards the corresponding local NAP. Each router decides if the flit is consumed in the node or forwarded to the next node based on a destination ID field in the flit. In some example embodiments, the flit has a 12-bit transport information and a 291-bit payload, but other formats are possible. The flit payload is utilized to carry various types of data, and in the case of AXI transactions, the 291-bit payload carries AXI signals. In non-AXI flits, the flits are configured to encapsulate raw data, Ethernet packets, or CXS streams. Multiple flit formats are supported for different types of loads.

In the case of AXI transactions, the EW router is attached to the EW NAP which acts as an AXI secondary to the user logic. The NS router is attached to the NS NAP which acts as an AXI primary over the user logic. Hence, the EW direction generates requests and receives responses while the NS direction receives commands and generates responses.

In the case of raw data transfers, the EW NAP generates raw data flits, which are received by another EW NAP. The transfer happens through the EW iNoC. Similarly, the NS NAP generates a raw data flit and is received by another NS NAP.

In the case of CXS flits, the NS NAP receives and generates the CXS flits, where each CXS flit encapsulates a CXS stream and is carried through the NS iNoC infrastructure towards the CXIU, which interfaces with PCIe or CCIX.

In the case of Ethernet flits, the NS NAP receives and generates the Ethernet packets. Each Ethernet flit encapsulates an Ethernet packet in full or in part. The iNoC infrastructure carries the data to the EIU, which handles the interfacing with the Ethernet MAC. This way, the iNoC 320 supports both memory-mapped data-transport infrastructure as well as pure data-stream-transport infrastructure.

Thus, the NoC provides a high-speed network that runs around the outside of the user logic, using very fast links (e.g., 2 gigahertz) that are thousands of bits wide, resulting in much lower latency and much higher throughput path to that memory without the user having to design any intermediate cluster 318 for communications. Thus, the FPGA may be unprogrammed and the PCIe controller 316 is able to talk to the DDR-4/5 controller 324 without any FPGA configuration. This allows the better use of user logic for the user's programmable functions.

In some example embodiments, the NoC is a transaction network that supports reads and writes. A read may be requested from any address and a write may be performed to any address.

To benefit from the NoC functionality, the user instantiates and configures a NAP in their design. To access the variety of IP visible through the NoC, the user configures the NAP. Further, to use the NoC to communicate between clusters 318 on the FPGA 302, the user instantiates NAP blocks at each node, and uses standard interfaces, such as AXI or Packet interfaces, or even uses the user's own interfaces. In summary, the NoC carries multiple types of traffic simultaneously.

For example, the user instantiates 256-bit NAPs in their design to gain access to the iNoC 320. Assuming the user's design is able to meet a frequency of 600 MHz, a single NAP provides 153.6 Gbps of read throughput, and 153.6 Gbps of write throughput.

Figure 4:
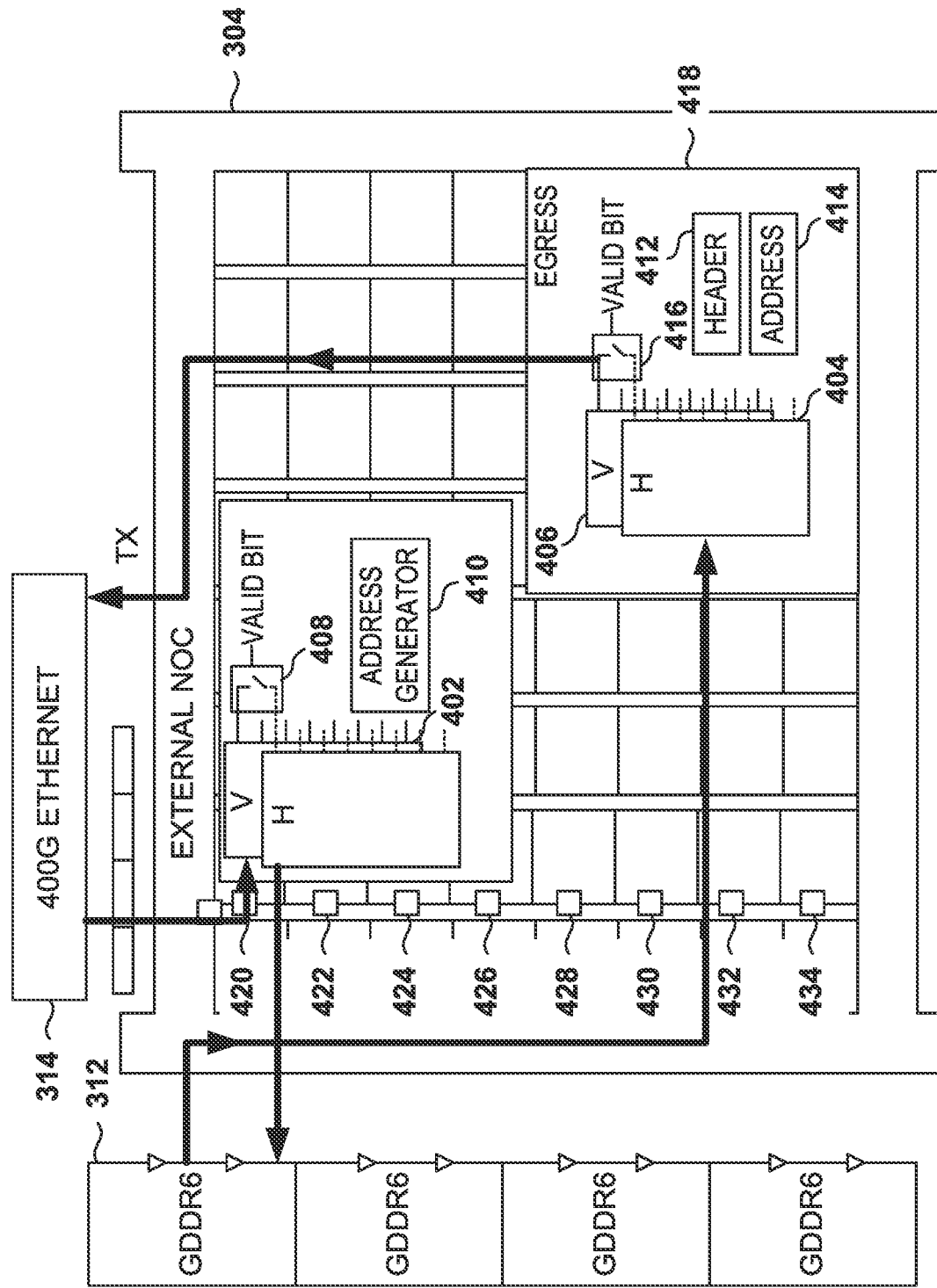
FIG. 4 illustrates the efficient routing of packets using vertical and horizontal communications, according to some example embodiments.

FIG. 4 illustrates the efficient routing of packets using vertical and horizontal communications, according to some example embodiments. In addition to supporting transactions, the iNoC columns carry Ethernet data. In the Rx direction, each Ethernet Interface Unit (EIU) (part of the Ethernet subsystem) (e.g., 420-434) accepts one or more streams of Ethernet traffic from the Ethernet MACs. The EIU tags the Ethernet data with the correct destination ID, which determines the destination node, based on the device configuration (e.g., the user maps physical MACs to destination nodes in the column), interleaves the data with data from other MACs, and sends packets down the column. In the Tx direction, the EIU is the destination and in the Rx direction, the NAP is the destination.

In some example embodiments, the horizontal NAP 420 (for communications along the rows) is collocated with the vertical NAP 402 (for communications along the columns) of the iNoC. The horizontal NAP 420 and the vertical NAP 402 are collocated because they are physically proximate to each other, so communications from the rows can quickly be routed to the columns and vice versa. In some example embodiments, a gate 408 connects a wire from the vertical NAP 402 to the horizontal NAP 420, and the gate 408 is controlled by a signal referred to as valid bit, such that when the valid bit is set to logical 1, then the two wires are connected together. The gate 408 could be an AND logical gate with inputs of the valid bit and the vertical wire and output is the horizontal wire. One gate 408 is illustrated, but additional gates are also placed for the rest of the wires in the vertical NAP 402, and the gates for all the wires share the valid-bit signal as an input.

Because the horizontal and vertical NAPs are collocated, sending data from the column to the row is fast and efficient, and the logic takes a very small amount of space in the FPGA core.

Further, in some example embodiments, the vertical NAP 402 wires and the horizontal NAP 420 wires are interleaved;

that is, the horizontal wires are placed alternately between the vertical wires in the same block. Because the wires are interleaved, the redirection of the data from one direction to another is very quick and the logic takes a very small amount of space on the FPGA.

A parser may analyze the Ethernet header and sends the payload of the Ethernet packet to external memory (e.g., GDDR6 controller 312). Therefore, an easy and fast way to send the payload to memory is to simply redirect the Ethernet packet payload coming down the iNoC column to the iNoC row by setting the valid bit and transmitting the incoming segments to the eNoC 304 and the memory GDDR6 controller 312.

For example, the parser looks at the incoming header and decides to send the payload to memory for later processing (e.g., TCP/IP packet being routed to the next destination as the FPGA acts as a network router). After some bytes of the beginning of the packet are received (e.g., the header plus 0 or more bytes), the parser quickly determines, in real time, that the payload will be sent to memory.

The user logic then activates the valid bit to copy the Ethernet packet bits from the vertical NAP 402 to the horizontal NAP 420. As the data comes in, the data is sent towards the memory, without having to store the complete Ethernet packet.

An address generator 410 in the user logic generates the memory address where the data is to be stored; the address is then used for routing the data to the memory (e.g., GDDR6 controller 312).

The iNoC 320 provides great flexibility to the user logic for quickly routing data from one place in the FPGA to another. The design of the user logic is simpler because the designer does not need to plan for complicated storing and forwarding of data within the FPGA.

On the outbound direction, typically, there will be an egress block 418 of user logic that sends Ethernet packets to the outside of the FPGA. In some cases, the Ethernet packet payload is in memory, so the egress block 418 has header information 412 and address information 414 of the Ethernet packet, where the address information 414 is the address in the external memory that holds all or part of the Ethernet packet. In some cases, the whole packet is stored in memory so the header information 412 is not required.

As in the inbound direction, the vertical NAP 406 and the horizontal NAP 404 are collocated and interleaved. A valid bit 416 is used to connect the wires of the horizontal NAP 404 to the wires of the vertical NAP 406.

The egress block 418 then issues a read request (e.g., AXI command) to get the Ethernet data from memory, and the Ethernet data arrives via the iNoC row. As the data arrives, the data is immediately copied to the iNoC column via the vertical NAP 406. The data then travels up through the column to the eNoC 304 and then to Ethernet controller 314.

If the header information 412 is not in memory, the egress block 418 attaches the header information 412 and then sends the header information 412 and the payload coming from memory to the eNoC 304.

In some example embodiments, the payload of the Ethernet packet is striped across multiple external memories (e.g., GDDR6 controller 312), which means that the data is stored in several memories. For example, a first chunk is stored in a first memory, a second check in a second memory, etc.

When getting the Ethernet data, the egress block 418 issues multiple reads for the different memories. This way, the possibilities of a deadlock or a bottleneck are reduced because the access to memory is load balanced.

Figure 5:
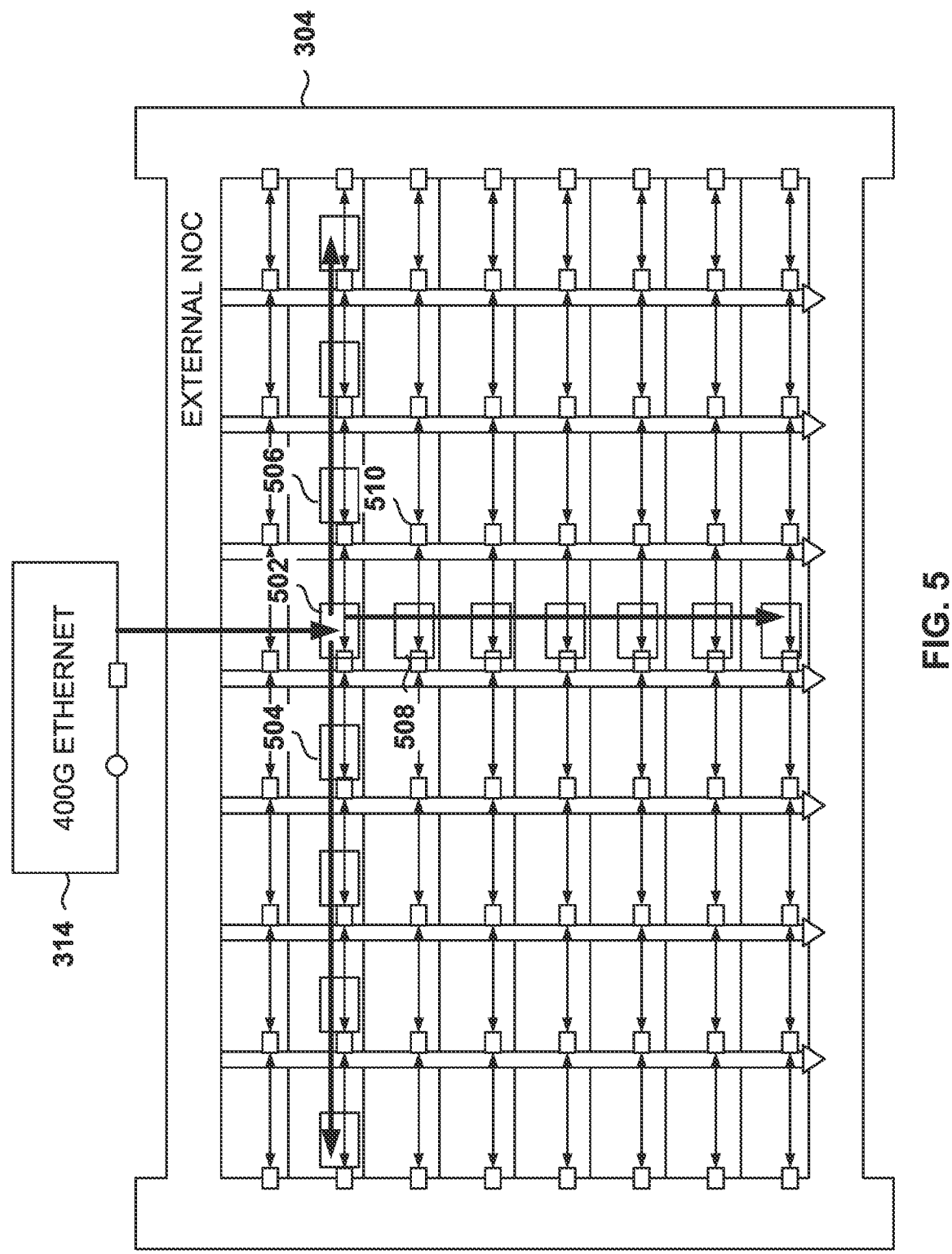
FIG. 5 illustrates the versatile routing of packets using multiple paths, according to some example embodiments.

FIG. 5 illustrates the versatile routing of packets using multiple paths, according to some example embodiments. When an Ethernet packet arrives at NAP 502, the user logic may command the NAP 502 to forward the westbound (e.g., NAP 504) or eastbound (e.g., NAP 506), and in the vertical direction, typically downward (e.g., NAP 508), although the NAP 502 may also send the data upward in a different cycle.

In some example embodiments, the transport in the iNoC uses AXI, which includes flit-to-flit transfer capabilities. This way, the data can be sent from one end of the FPGA to another end. In traditional approaches, the network traffic at the FPGA is handled in one location, which causes congestion in the area. However, with the current approach, the processing of network traffic may be distributed throughout the FPGA. For example, the egress block 418 of FIG. 4 is situated far away from the NAP 420 that parses the Ethernet headers.

Further, the encryption engine may be located at user logic coupled to NAP 506 without having to send the data down on the iNoC column, and the TCP/IP engine may be situated at the user logic coupled to NAP 506. Furthermore, other NAPs (e.g., NAP 508) can send Ethernet packets to the decryption engine coupled to NAP 506 by sending the data on a different row and then up another column. For example, NAP 508 could send encrypted packets via NAP 510 that forwards the encrypted packets to NAP 506.

And all this traffic is possible without having to store and forward the packets, which greatly improves efficiency and processing speed. The forwarding can be on the same cycle as the one on which the data arrives (e.g., from Ethernet controller 314).

In some example embodiments, the iNoC column includes the valid signal, a ready signal, and a destination signal. The ready signal indicates when the vertical iNoC is ready to accept data. The destination signal includes the address of the NAP that is the destination for the data. At every cycle, the valid signal and the destination signal are specified to route the data to its destination.

Each NAP can be configured for streaming mode, which means that the data is forwarded to another NAP as the data is being received. For example, by setting the valid signal to active, data is redirected towards another NAP in the iNoC row. The NAPs may also be configured as AXI nodes, which means that the data will use flits to be transferred through the iNoC.

Further, the flexible network capabilities of the iNoC also help to ease the handling of Ethernet packets in packet mode. In fact, packet mode may be very useful in certain cases. Since all data for one Ethernet packet comes to the same NAP, this NAP can parse the header and then determine where to send the header and the payload. As the additional segments of the Ethernet packet arrive to the NAP with the parser, the segments are then quickly streamed to other NAPs or to memory. The encrypted packet will be sent to the decryption engine one segment at a time, so the decryption engine will not be overwhelmed with too much data.

Figure 6:
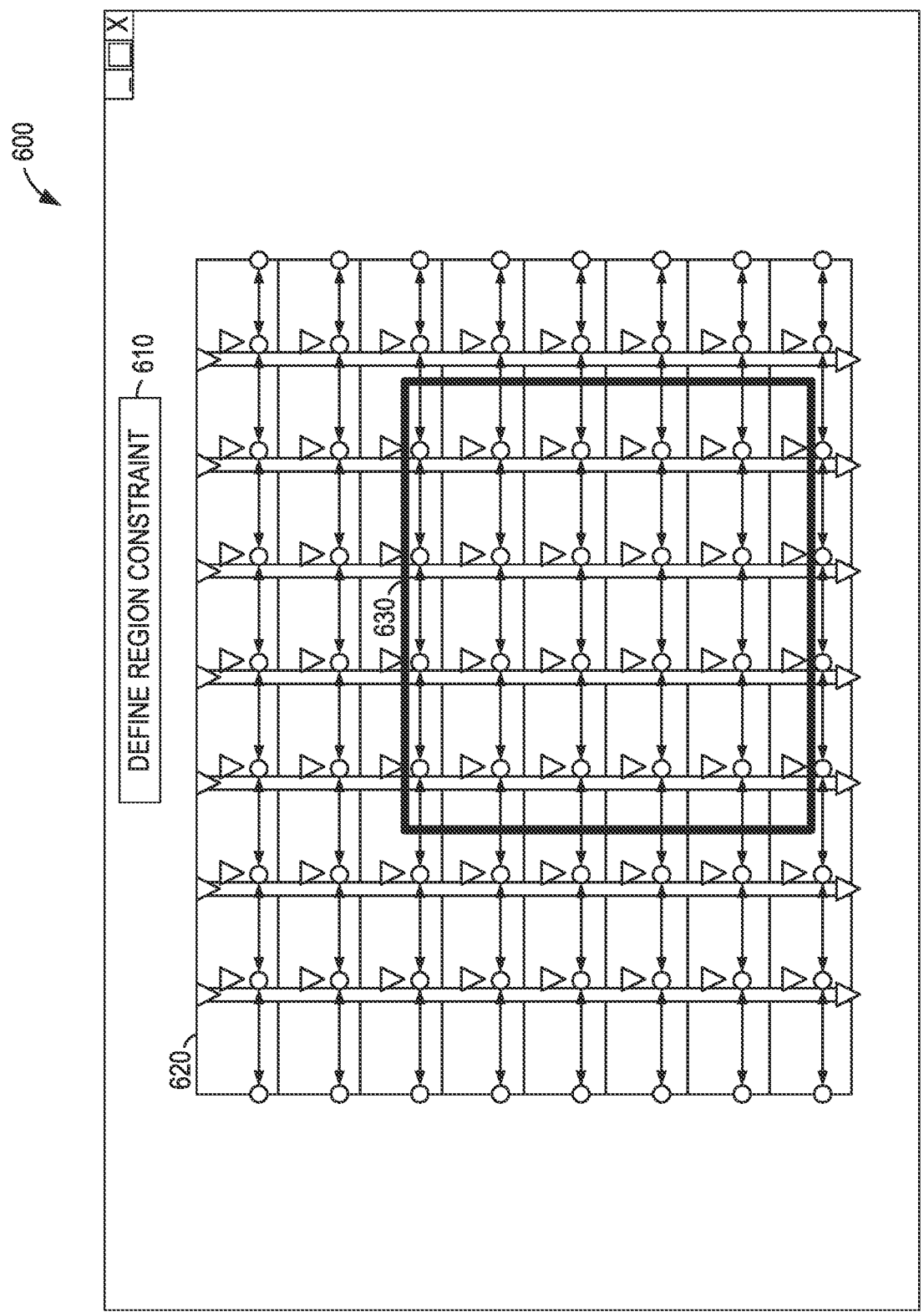
FIG. 6 illustrates an example user interface to define a region constraint for a partition.

FIG. 6 illustrates an example user interface 600 to define the region constraint for a partition. The place and route program will ensure all resources (including instance placements and routing wires) related to this partition are mapped to this region. The user interface 600 includes a title 610, a view 620 of the chip design, and a selection region 630. The user interface 600 may be presented on a display device to allow a user to select a region to constrain place and route. In some example embodiments, the user interface 600 limits the selection to a rectangular region or a rectilinear region.

The title 610 indicates that the user interface 600 is for defining a region constraint. The view 620 shows the chip design. The view 620 may be panned, scrolled, zoomed, or rotated using keyboard commands, mouse commands, touchscreen commands, voice commands, or any suitable combination thereof. The selection region 630 instructs the place and route program to constrain placement and routing for a partition to this region and may be defined using a mouse (e.g., click-and-drag), a touch screen, keyboard commands, or any suitable combination thereof. For example, a file describing the chip design may include a command such as "create region {mlp_conv2d_region_1} {117 110 121 153}." This command creates a region named "mlp_conv2d_region_1" with specified lower-left and upper-right coordinates (117, 110)-(121,153). A second command, "add_region_find_insts {mlp_conv2d_region_1} {find {mlp_conv2d_top_i.*}-insts}", adds all instances in the partition to this region.

After place and route, the user can instruct the export component 275 to save the partition in this region as a partition database. The database contains the placement information for all instances, and the configuration of all routing multiplexers, logic elements, etc. corresponding to the nets in the partition as they exist after placement and routing.

Figure 7:
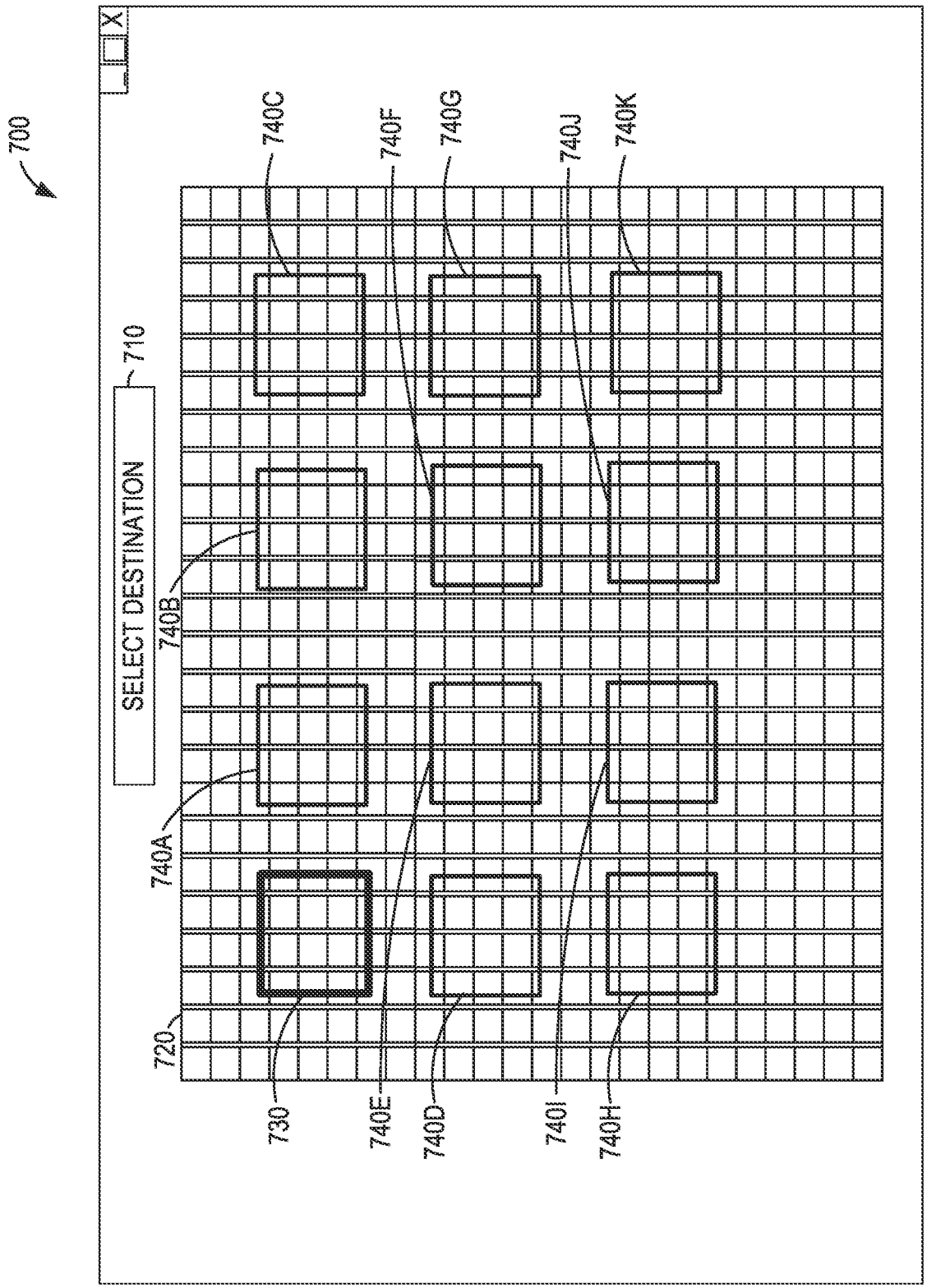
FIG. 7 illustrates an example user interface for selecting a destination to relocate a selected partition.

FIG. 7 illustrates an example user interface 700 for selecting a destination to relocate a selected partition. The user interface 700 includes a title 710, a view 720 of the chip design, a selected module 730, and relocation indicators 740A, 740B, 740C, 740D, 740E, 740F, 740G, 740H, 740I, 740J, and 740K.

The title 710 indicates that the user interface 700 is for selection of a destination to move or copy a partition. The view 720 may be panned, scrolled, zoomed, or rotated using keyboard commands, mouse commands, touchscreen commands, voice commands, or any suitable combination thereof. In the examples of FIGS. 6-7, the view 620 is zoomed in on an area of interest and the view 720 shows a larger portion of the chip design. This may be helpful to allow a user to see the details of the partition being copied in the user interface 600. In addition, this interface allows the user to choose an anchor instance, any selectable instance in the imported partition, which defines a physical reference point to which all other relocatable objects (instances and wires) in the partition can be relatively located. In some embodiments, anchor instances are automatically identified by the relocation module, e.g. the largest instance. Thus, in the user interface 700, the relocation locations 740A-740K are pre-identified for the user. The relocation locations may be rectangular, as shown in FIG. 7, or rectilinear. Accordingly, the term "bounding box" refers to the boundary of the relocation locations and is not necessarily a rectangular shape.

The relocation locations 740A-740K may be identified in response to commands in a shell interface or a script file. For example, the command "get_compatible_placements {/mlp_conv2d_top_wrapper/mlp_conv2d_top_i}-anchor {mlp_conv2d_top_i.i_axi_secondary_wrapper_out.i_axi_secondary}-outputfile {compatible_placements.pdc}" may be used to identify the compatible relocation locations for the partition mlp_conv2d_top_i which is a sub-module located inside the top-level module mlp_conv2d_top_wrapper. The system will use an instance in that module with the identifier mlp_conv2d_top_i.i_axi_secondary_wrapper_out.i_axi_secondary as the anchor instance. The location information will be placed in an identified output file (compatible_placements.pdc, in this example). An example output file portion is shown below.

```
set_placement -partition
    {mlp_conv2d_top_i.i_axi_secondary_wrapper_out.i_axi_secondary}
    {x_core.NOC[1][8].logic.noc.nap_s}
set_placement -partition
    {mlp_conv2d_top_i.i_axi_secondary_wrapper_out.i_axi_secondary}
    {x_core.NOC[2][8].logic.noc.nap_s}
set_placement -partition
    {mlp_conv2d_top_i.i_axi_secondary_wrapper_out.i_axi_secondary}
    {x_core.NOC[3][8].logic.noc.nap_s}
```

Each of the above "set placement" commands identifies the name of a partition anchor instance, and a compatible location at which the instance may be placed. The instance happens to be a NAP instance, and the coordinates [1][8], [2][8], and [3][8] identify specific NAP sites in the FPGA fabric, and thus identify specific clusters on an FPGA to which the partition may be relocated. The-partition option indicates that the command applies to an entire partition, with the named instance (mlp_conv2dtop_i.i_axi_secondary_wrapperout.i_axi_secondary) as the partition anchor, rather than just to a single instance.

Each of the relocation locations 740A-740K identifies a possible location that the selected partition can be moved to without recompilation. The user may select one of the relocation locations 740A-740K. In response to the user selection, the relocation component 290 relocates the selected partition (and all of the instances and wires it contains) to the selected location. Since the relocation locations 740A-740K were already determined to be compatible with the selected partition, no recompilation of the generated partition is required to perform the relocation.

In some example embodiments, based on the selected portion of the design having been imported, the import component 280 prevents optimization of the selected portion of the design. Optimization of the selected portion of the design may change the inputs of the selected portion, the outputs of the selected portion, any of the contents of the portion, or the timing of the selected portion. Accordingly, the place-and-route step for the selected portion would have to be repeated if optimization were performed. By preventing optimization, the place-and-route step may be skipped for imported partitions, regardless of the number of times it is replicated within the design. Without loss of generality, some portions of the imported partitions may still need to be processed by the placement and routing step. Such portions could include global clock and reset nets, clock switch and clock divider instances, and any global nets that connect one partition to another, or that connect a partition to the boundary input/output (I/O) ports.

Figure 8:
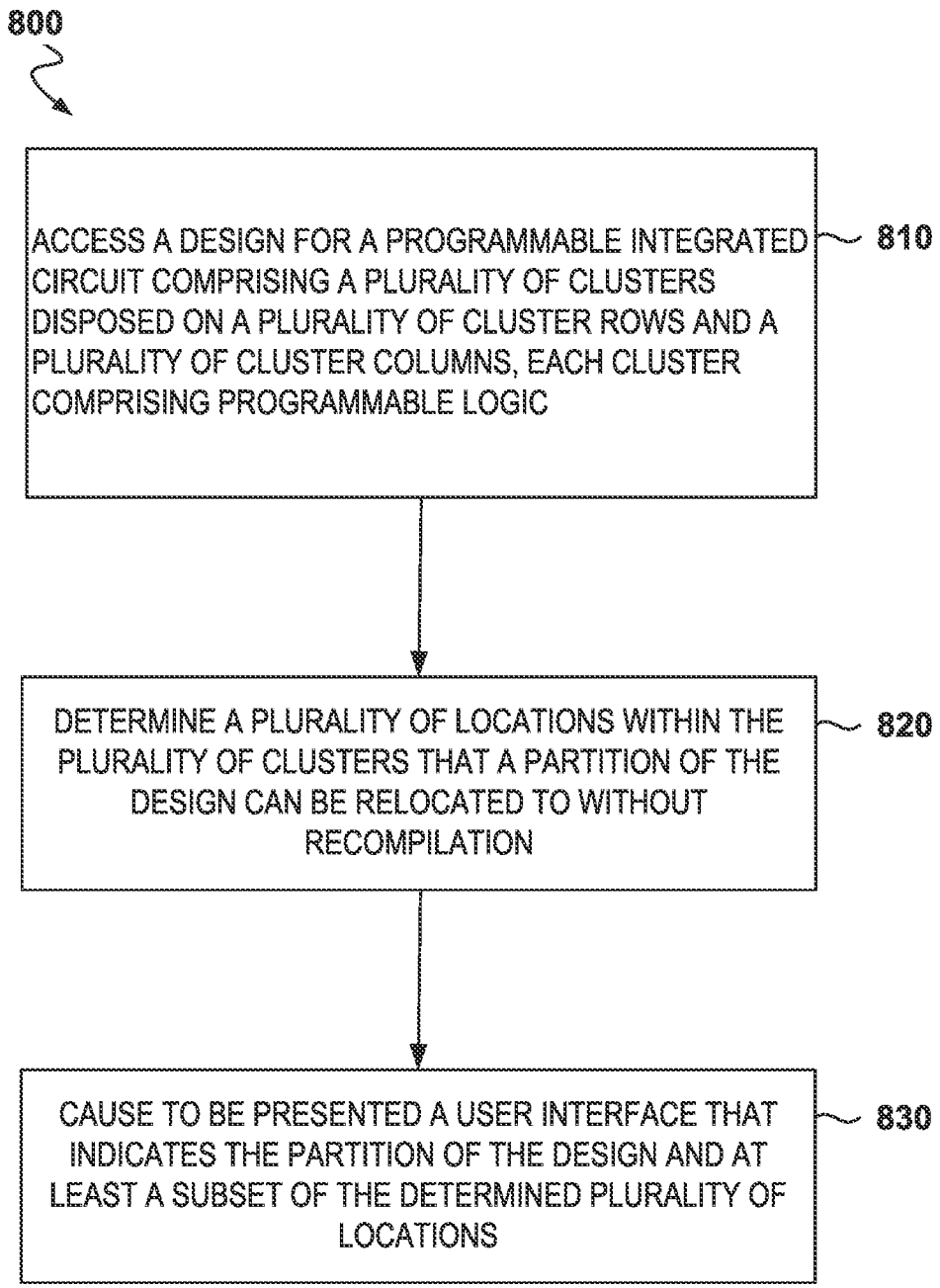
FIG. 8 is a flowchart of a method for relocating a partition in an FPGA without recompilation of the module.

FIG. 8 is a flowchart of a method for relocating a module in an FPGA without recompilation of the module. The method 800 includes operations 810, 820, and 830. By way of example and not limitation, the method 800 is described as being performed by the system and modules of FIG. 2, using the circuit designs and user interfaces of FIGS. 1 and 3-7.

In operation 810, the relocation component 290 accesses a design for a programmable integrated circuit comprising a plurality of clusters disposed on a plurality of cluster rows and a plurality of cluster columns, each cluster comprising programmable logic. For example, with reference to FIG. 1, it can be seen that the logic blocks 101 are organized into rows and columns and comprise programmable logic. As another example, with reference to FIG. 3, it can be seen that the clusters 318 are organized into rows and columns and comprise programmable logic. Thus, either the design of FIG. 1 or the design of FIG. 3 may be accessed in operation 810.

The relocation component 290, in operation 820, determines a plurality of locations within the plurality of clusters that a selected partition of the design can be relocated to without recompilation. For example, the user interface 700 of FIG. 7 may be used to identify the selected partition in the design. The determining of the plurality of locations may be based on a signature calculated from the set of fabric tiles enclosed by the region constraint inside which the partition has been placed and routed.

The signature of a portion of an FPGA (either a partition selected for relocation or a location selected as an available destination for relocation of the partition) may be determined based on the types of FPGA fabric tiles enclosed by the placement and routing bounding box of the partition. For example, a coordinate system may be used with (0,0) defined to be one corner of the bounding box and (X, Y) defined to be the opposite corner, where (X−1) and (Y−1) are the size of the two-dimensional bounding box along the x- and y-axes, respectively. A numerical code for the type of the tile is appended to the coordinates of the tile, resulting in a triple for the tile (x, y, code). The triples for all tiles may be concatenated to generate the signature. In some example embodiments, the representation of the coordinate points and codes is hashed to generate the signature. By way of example and not limitation, the table below may be used to determine tile type codes.

| Tile type | Code |
|---|---|
| Look Up Table (LUT) | 1 |
| Block Random Access Memory (BRAM) | 2 |
| Logic Random Access Memory (LRAM) | 3 |
| Digital Signal Processor (DSP) | 4 |
| Machine Learning Processor (MLP) | 5 |
| Input Pad (IPAD) | 6 |
| Output Pad (OPAD) | 7 |
| Network Access Point (NAP) | 8 |

In some example embodiments, the selected portion of the design may use "loopback" connections at the boundary of the FPGA fabric. For example, the top (North) boundary tiles will have routing tracks coming from the South that instead of being terminated (left dangling) in the boundary tile are looped back to the tile immediately below it. Those special loopback connections, if used in the source module, will also need to be present in the relocation locations, or inserted as an additional step after relocation to non-boundary locations.

In some example embodiments, each cluster of the plurality of clusters comprises a network on chip (NoC) endpoint (e.g., as described with respect to FIG. 3). The selected portion of the design may be within a cluster of the plurality of clusters and be located at a determined offset from the NoC endpoint of the cluster. For example, the offset may be measured from the NoC endpoint of the cluster to the lower-left corner of the selected portion. Alternatively, the selected portion of the design may span multiple clusters of the plurality of clusters and be located at a determined offset from the NoC endpoint of one of the spanned clusters. For example, the offset may be measured from the NoC endpoint of the lowest-left spanned cluster to the lower-left corner of the selected portion. The determining of the plurality of locations that the selected portion of the design can be relocated to without recompilation may comprise determining locations at the determined offset from the NoC endpoints of other clusters of the plurality of clusters.

In operation 830, the relocation component 290 causes to be presented a user interface that indicates a selected partition in the design that has been selected for relocation, and at least a subset of the determined plurality of compatible locations where that partition can be relocated. For example, the user interface 700 of FIG. 7 may be used to indicate the selected partition in the design and at least some of the determined locations. In response to selection of one of the determined plurality of locations, the partition will be relocated by the relocation component 290 from its source location to the selected target location.

Thus, by use of the method 800, the selected partition is relocated from its source location to the selected target location without recompiling the selected partition. As a result, the processing steps involved in recompilation (e.g., synthesis, placement, and routing) are avoiding, reducing the consumption of computing resources in relocating the selected partition.

Figure 9:
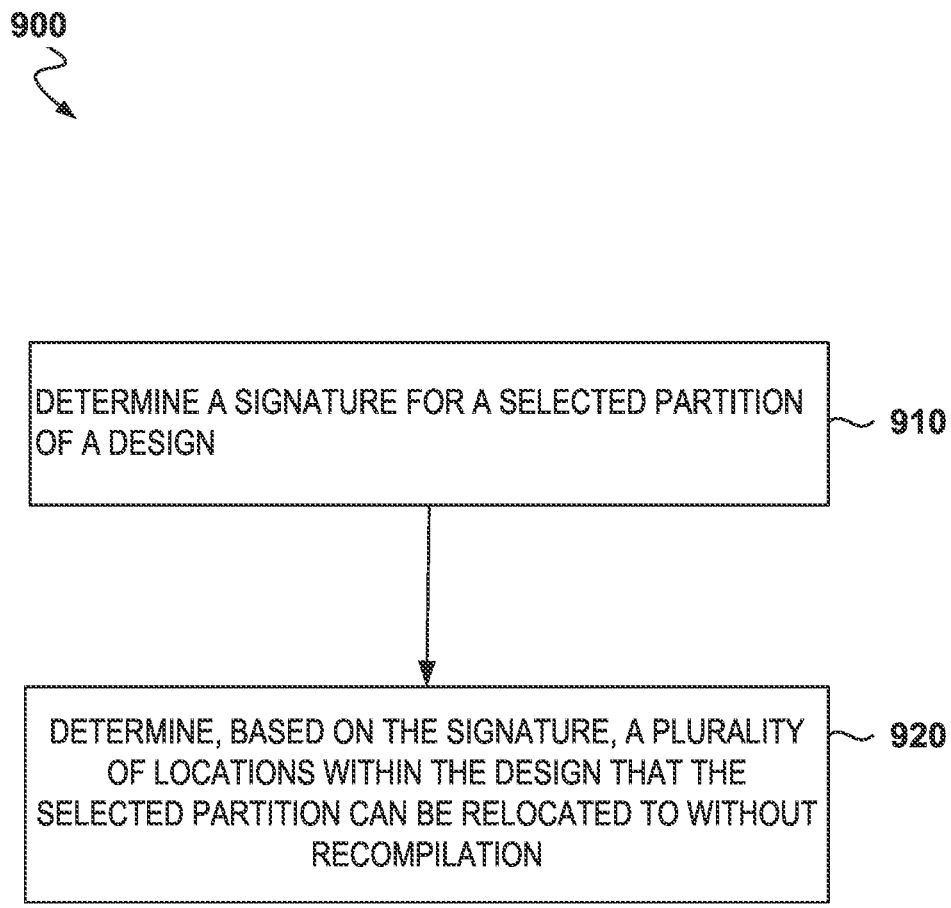
FIG. 9 is a flowchart of a method for determining locations to which a partition can be relocated in an FPGA without recompilation.

FIG. 9 is a flowchart of a method for determining locations to which a partition can be relocated in an FPGA without recompilation. The method 900 includes operations 910 and 920. By way of example and not limitation, the method 900 is described as being performed by the computer 200 of FIG. 2 to design the FPGA of FIGS. 1 and 3-5 using the user interfaces of FIGS. 6-7. The method 900 may be used to perform the operation 820 of the method 800.

In operation 910, the relocation component 290 determines a signature for a selected partition in a design. For example, the user interface 700 may be used to receive a list of modules in the original specification for the design (before it was flattened) that have been specified as partitions, and allow the user to select one. The signature for the partition may be based on the types of the tiles enclosed by a bounding box drawn to enclose all of the placed instances and routed wires that belong to the partition. In the example of FIG. 7, the selection is the anchor instance of the selected partition.

Based on the signature calculated in operation 910, the relocation component 290 determines a plurality of locations within the design that the selected partition can be relocated to without recompilation (operation 920). For example, a sliding window the same size as the partition's bounding box may be moved to each possible location within the FPGA fabric. Thus, by iterating over every possible starting x, y position with a bounding box having the same dimensions as the partition's bounding box, all candidate locations for the partition are identified. In some example embodiments, clock tiles are excluded from the determination of whether two bounding boxes have the same dimensions. At each candidate location, a signature for the sliding window is determined. If the signature for the candidate location is the same as the signature for the selected partition, the candidate location is a location within the fabric that the selected portion of the design can be relocated to without recompilation. The user interface 700 may be used to present the determined locations to a user, as discussed in operation 830 of the method 800.

In the foregoing specification, some example implementations of the disclosure have been described. The specification and drawings are, accordingly, to be regarded in an illustrative sense rather than in a restrictive sense. Below is a non-exhaustive list of examples of implementations of the present disclosure.

Example 1 is a method comprising: accessing, by one or more processors, a design for a programmable integrated circuit comprising a plurality of clusters disposed on a plurality of cluster rows and a plurality of cluster columns, each cluster comprising programmable logic; accessing, by the one or more processors, a selection of a portion of the design; determining, by the one or more processors, a plurality of locations within the plurality of clusters that the selected portion of the design can be relocated to without recompilation; and causing to be presented, by the one or more processors, a user interface that indicates the selected portion of the design and at least a subset of the determined plurality of locations.

In Example 2, the subject matter of Example 1 includes wherein: each cluster of the plurality of clusters comprises a network on chip (NoC) endpoint; the selected portion of the design is within a cluster of the plurality of clusters and located at a determined offset from the NoC endpoint of the cluster; and the determining of the plurality of locations that the selected portion of the design can be relocated to without recompilation comprises determining locations at the determined offset from the NoC endpoints of other clusters of the plurality of clusters.

In Example 3, the subject matter of Examples 1-2 includes receiving, via the user interface, a selection of a location of the at least a subset of the determined plurality of locations; in response to the selection, replicating the selected portion of the design at the selected location.

In Example 4, the subject matter of Example 3 includes, based on the selected portion of the design having been relocated, preventing modification of the logic, interconnection, placement and routing of the relocated portion of the design at the selected location.

In Example 5, the subject matter of Examples 1-4 includes determining, based on a location of the selected portion of the design, a signature for the selected portion of the design; wherein the determining of the plurality of locations that the selected portion of the design can be relocated to without recompilation is based on the signature.

In Example 6, the subject matter of Example 5 includes wherein: the determining of the signature for the selected portion of the design is further based on a width and a height of the selected portion of the design.

In Example 7, the subject matter of Examples 5-6 includes wherein: the determining of the signature for the selected portion of the design is further based on types of connections at edges of the selected portion of the design.

In Example 8, the subject matter of Examples 5-7 includes wherein: the determining of the signature for the selected portion of the design is further based on types of tiles of the selected portion of the design.

In Example 9, the subject matter of Examples 5-8 includes determining a signature for each of a plurality of candidate locations in the design; wherein the determining of the plurality of locations that the selected portion of the design can be relocated to without recompilation is further based on the signatures for the plurality of candidate locations.

Example 10 is a system comprising: one or more processors; and a memory storing instructions that, when executed by the one or more processors, cause the one or more processors to perform operations comprising: accessing a design for a programmable integrated circuit comprising a plurality of clusters disposed on a plurality of cluster rows and a plurality of cluster columns, each cluster comprising programmable logic; accessing, by the one or more processors, a selection of a portion of the design; determining a plurality of locations within the plurality of clusters that the selected portion of the design can be relocated to without recompilation; and causing to be presented a user interface that indicates the selected portion of the design and at least a subset of the determined plurality of locations.

In Example 11, the subject matter of Example 10 includes wherein: each cluster of the plurality of clusters comprises a network on chip (NoC) endpoint; the selected portion of the design is within a cluster of the plurality of clusters and located at a determined offset from the NoC endpoint of the cluster; and the determining of the plurality of locations that the selected portion of the design can be relocated to without recompilation comprises determining locations at the determined offset from the NoC endpoints of other clusters of the plurality of clusters.

In Example 12, the subject matter of Examples 10-11 includes wherein the operations further comprise: receiving, via the user interface, a selection of a location of the at least a subset of the determined plurality of locations; in response to the selection, replicating the selected portion of the design at the selected location.

In Example 13, the subject matter of Example 12 includes wherein the operations further comprise: based on the selected portion of the design having been relocated, preventing optimization of the relocated portion of the design at the selected location.

In Example 14, the subject matter of Examples 10-13 includes wherein the operations further comprise: determining, based on a location of the selected portion of the design, a signature for the selected portion of the design; wherein the determining of the plurality of locations that the selected portion of the design can be relocated to without recompilation is based on the signature.

In Example 15, the subject matter of Example 14 includes wherein: the determining of the signature for the selected portion of the design is further based on a width and a height of the selected portion of the design.

Example 16 is a non-transitory machine-readable medium that stores instructions that, when executed by one or more processors, cause the one or more processors to perform operations comprising: accessing a design for a programmable integrated circuit comprising a plurality of clusters disposed on a plurality of cluster rows and a plurality of cluster columns, each cluster comprising programmable logic; accessing, by the one or more processors, a selection of a portion of the design; determining a plurality of locations within the plurality of clusters that the selected portion of the design can be relocated to without recompilation; and causing to be presented a user interface that indicates the selected portion of the design and at least a subset of the determined plurality of locations.

In Example 17, the subject matter of Example 16 includes wherein: each cluster of the plurality of clusters comprises a network on chip (NoC) endpoint; the selected portion of the design is within a cluster of the plurality of clusters and located at a determined offset from the NoC endpoint of the cluster; and the determining of the plurality of locations that the selected portion of the design can be relocated to without recompilation comprises determining locations at the determined offset from the NoC endpoints of other clusters of the plurality of clusters.

In Example 18, the subject matter of Examples 16-17 includes wherein the operations further comprise: receiving, via the user interface, a selection of a location of the at least a subset of the determined plurality of locations; in response to the selection, replicating the selected portion of the design at the selected location.

In Example 19, the subject matter of Example 18 includes wherein the operations further comprise: based on the selected portion of the design having been relocated, preventing optimization of the relocated portion of the design at the selected location.

In Example 20, the subject matter of Examples 16-19 includes wherein the operations further comprise: determining, based on a location of the selected portion of the design, a signature for the selected portion of the design; wherein the determining of the plurality of locations that the selected portion of the design can be relocated to without recompilation is based on the signature.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

The Abstract of the Disclosure is provided to comply with 37 C.F.R. § 1.72(b), requiring an abstract that allows the reader to quickly ascertain the nature of the technical disclosure. It is submitted with the understanding that it will not be used to interpret or limit the claims. In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

Figure 10:
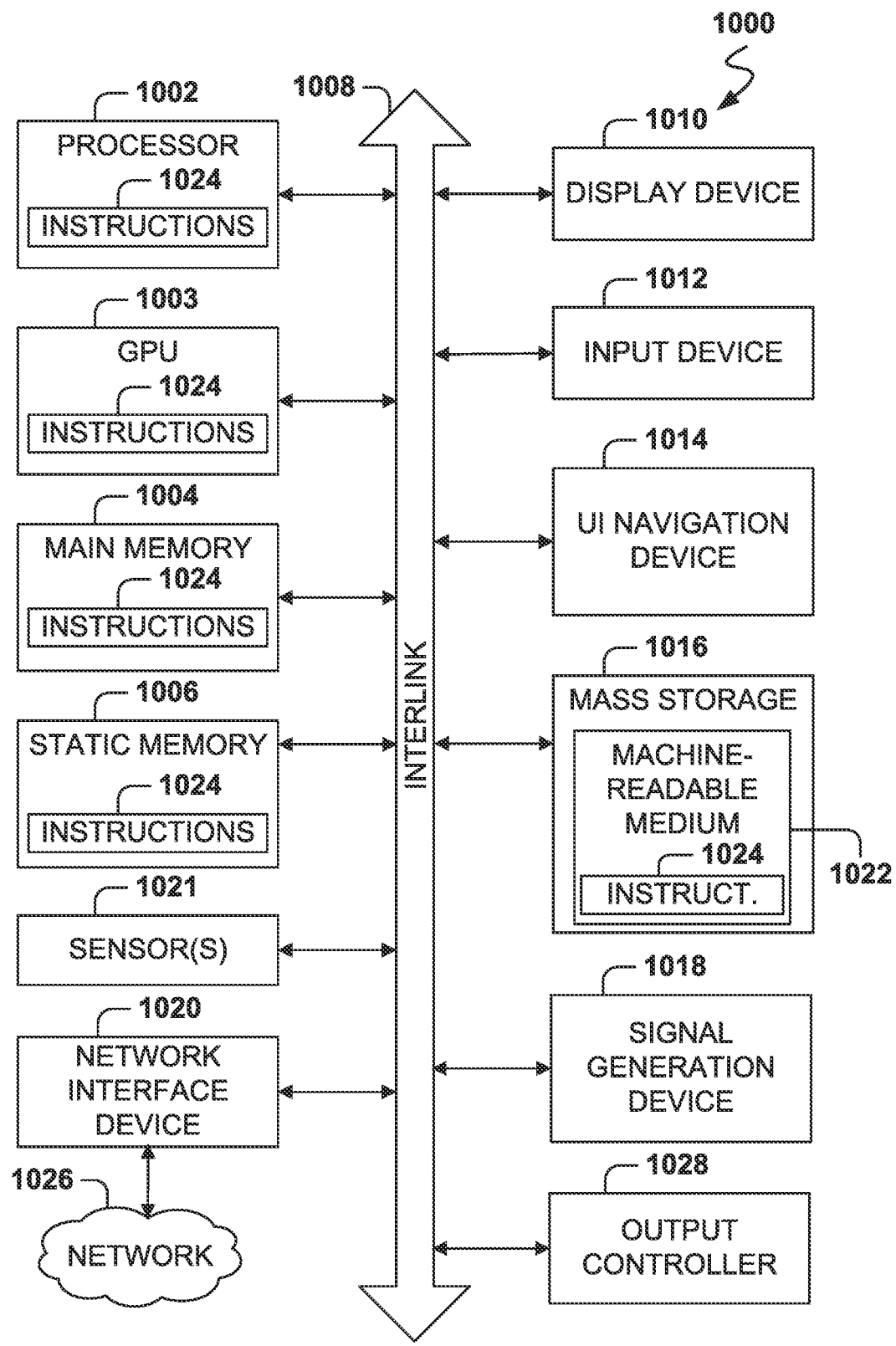
FIG. 10 is a block diagram illustrating an example of a machine upon or by which one or more example process embodiments described herein may be implemented or controlled.

FIG. 10 is a block diagram illustrating an example of a machine 1000 upon or by which one or more example process embodiments described herein may be implemented or controlled. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in a peer-to-peer (P2P) (or other distributed) network environment. Further, while only a single machine 1000 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1000 may include a hardware processor 1002 (e.g., a central processing unit (CPU), a hardware processor core, or any combination thereof), a graphics processing unit (GPU) 1003, a main memory 1004, and a static memory 1006, some or all of which may communicate with each other via an interlink (e.g., bus) 1008. The machine 1000 may further include a display device 1010, an alphanumeric input device 1012 (e.g., a keyboard), and a user interface (UI) navigation device 1014 (e.g., a mouse). In an example, the display device 1010, alphanumeric input device 1012, and UI navigation device 1014 may be a touch screen display. The machine 1000 may additionally include a mass storage device (e.g., drive unit) 1016, a signal generation device 1018 (e.g., a speaker), a network interface device 1020, and one or more sensors 1021, such as a Global Positioning System (GPS) sensor, compass, accelerometer, or another sensor. The machine 1000 may include an output controller 1028, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, within the hardware processor 1002, or within the GPU 1003 during execution thereof by the machine 1000. In an example, one or any combination of the hardware processor 1002, the GPU 1003, the main memory 1004, the static memory 1006, or the mass storage device 1016 may constitute machine-readable media.

While the machine-readable medium 1022 is illustrated as a single medium, the term "machine-readable medium" may include a single medium, or multiple media, (e.g., a centralized or distributed database, and/or associated caches and servers) configured to store the one or more instructions 1024.

The term "machine-readable medium" may include any medium that is capable of storing, encoding, or carrying instructions 1024 for execution by the machine 1000 and that cause the machine 1000 to perform any one or more of the techniques of the present disclosure, or that is capable of storing, encoding, or carrying data structures used by or associated with such instructions 1024. Non-limiting machine-readable medium examples may include solid-state memories, and optical and magnetic media. In an example, a massed machine-readable medium comprises a machine-readable medium 1022 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   accessing, by one or more processors, a design for a programmable integrated circuit comprising a plurality of clusters disposed on a plurality of cluster rows and a plurality of cluster columns, each cluster comprising programmable logic and a network on chip (NoC) endpoint;
   accessing, by the one or more processors, a selection of a selected portion of the design, that is within a cluster of the plurality of clusters and located at a determined offset from the NoC endpoint of the cluster;
   determining, by the one or more processors, a plurality of locations within the plurality of clusters that the selected portion of the design can be relocated to without recompilation based on the determined offset; and
   causing to be presented, by the one or more processors, a user interface that indicates the selected portion of the design and at least a subset of the determined plurality of locations.

2. The method of claim 1, further comprising:
   receiving, via the user interface, a selection of a location of the at least a subset of the determined plurality of locations;
   in response to the selection, relocating the selected portion of the design to the selected location.

3. The method of claim 2, further comprising:
   based on the selected portion of the design having been relocated, preventing modification of logic, interconnection, placement and routing of the relocated portion of the design at the selected location.

4. The method of claim 1, further comprising:
   determining a signature for the selected portion of the design based on types of connections at edges of the selected portion of the design.

5. The method of claim 1, further comprising:
   determining a signature for the selected portion of the design based on types of tiles of the selected portion of the design.

6. The method of claim 1, further comprising:
   determining a signature for each of the plurality of locations by iterating over every possible starting x, y position of the design with a bounding box having a width and height equal to a width and height of the selected portion of the design.

7. The method of claim 1, wherein at least two of the plurality of locations within the plurality of clusters that the selected portion of the design can be relocated to without recompilation overlap.

8. The method of claim 1, further comprising:
   adding, to the design, virtual pins at boundaries of the selected portion of the design; and
   flattening the design without performing optimizations across the boundaries identified by the virtual pins.

9. A system comprising:
   one or more processors; and
   a memory storing instructions that, when executed by the one or more processors, cause the one or more processors to perform operations comprising:
   accessing a design for a programmable integrated circuit comprising a plurality of clusters disposed on a plurality of cluster rows and a plurality of cluster columns, each cluster comprising programmable logic and a network on chip (NoC) endpoint;

accessing a selection of a selected portion of the design, that is within a cluster of the plurality of clusters and located at a determined offset from the NoC endpoint of the cluster;

determining a plurality of locations within the plurality of clusters that the selected portion of the design can be relocated to without recompilation based on the determined offset; and causing to be presented a user interface that indicates the selected portion of the design and at least a subset of the determined plurality of locations.

10. The system of claim 9, wherein the operations further comprise:

receiving, via the user interface, a selection of a location of the at least a subset of the determined plurality of locations;

in response to the selection, relocating the selected portion of the design to the selected location.

11. The system of claim 10, wherein the operations further comprise:

based on the selected portion of the design having been relocated, preventing optimization of the relocated portion of the design at the selected location.

12. The system of claim 9, wherein the operations further comprise:

determining a signature for the selected portion of the design based on types of connections at edges of the selected portion of the design.

13. The system of claim 9, wherein the operations further comprise:

determining a signature for the selected portion of the design based on types of tiles of the selected portion of the design.

14. The system of claim 9, wherein the operations further comprise:

determining a signature for each of the plurality of locations by iterating over every possible starting x, y position of the design with a bounding box having a width and height equal to a width and height of the selected portion of the design.

15. The system of claim 9, wherein at least two of the plurality of locations within the plurality of clusters that the selected portion of the design can be relocated to without recompilation overlap.

16. A non-transitory machine-readable medium that stores instructions that, when executed by one or more processors, cause the one or more processors to perform operations comprising:

accessing a design for a programmable integrated circuit comprising a plurality of clusters disposed on a plurality of cluster rows and a plurality of cluster columns, each cluster comprising programmable logic and a network on chip (NoC) endpoint;

accessing a selection of a selected portion of the design, that is within a cluster of the plurality of clusters and located at a determined offset from the NoC endpoint of the cluster;

determining a plurality of locations within the plurality of clusters that the selected portion of the design can be relocated to without recompilation based on the determined offset; and causing to be presented a user interface that indicates the selected portion of the design and at least a subset of the determined plurality of locations.

17. The non-transitory machine-readable of claim 16, wherein the operations further comprise:

receiving, via the user interface, a selection of a location of the at least a subset of the determined plurality of locations;

in response to the selection, relocating the selected portion of the design to the selected location.

18. The non-transitory machine-readable of claim 17, wherein the operations further comprise:

based on the selected portion of the design having been relocated, preventing optimization of the relocated portion of the design at the selected location.

19. The non-transitory machine-readable of claim 16, wherein the operations further comprise:

determining a signature for the selected portion of the design based on types of connections at edges of the selected portion of the design.

20. The non-transitory machine-readable of claim 16, wherein the operations further comprise:

adding, to the design, virtual pins at boundaries of the selected portion of the design; and flattening the design without performing optimizations across the boundaries identified by the virtual pins.

* * * * *

UNITED STATES PATENT AND TRADEMARK OFFICE
CERTIFICATE OF CORRECTION

PATENT NO. : 12,093,623 B2  
APPLICATION NO. : 18/226108  
DATED : September 17, 2024  
INVENTOR(S) : Riepe et al.

Page 1 of 1

It is certified that error appears in the above-identified patent and that said Letters Patent is hereby corrected as shown below:

In the Specification

In Column 5, Line 59, delete "RAMS," and insert --RAMs,-- therefor

In Column 15, Line 12, delete ""create region" and insert --"create_region-- therefor In Column 16, Line 27, delete "set placement" and insert --"set_placement"-- therefor In Column 16, Lines 35-36, delete "(mlp_conv2dtop_i.i_axi_secondary_wrapperout.i_axi_secondary)" and insert --(mlp_conv2d_top_i.i_axi_secondary_wrapper_out.i_axi_secondary)-- therefor Signed and Sealed this  
Twenty-seventh Day of May, 2025

Coke Morgan Stewart  
*Acting Director of the United States Patent and Trademark Office*